United States Patent
Heyl et al.

(10) Patent No.: US 6,722,147 B2
(45) Date of Patent: Apr. 20, 2004

(54) COOLANT CIRCUIT OF A MOTOR VEHICLE HAVING A COOLANT/REFRIGERANT HEAT EXCHANGER

(75) Inventors: Peter Heyl, Cologne (DE); Jörn Fröhling, Cologne (DE)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/223,268

(22) Filed: Aug. 19, 2002

(65) Prior Publication Data

US 2003/0046945 A1 Mar. 13, 2003

(30) Foreign Application Priority Data

Aug. 20, 2001 (DE) .......................................... 101 41 389

(51) Int. Cl.[7] .................................................. B60H 1/32
(52) U.S. Cl. .............................. 62/244; 62/434; 62/435
(58) Field of Search ........................ 62/239, 244, 324.6, 62/434, 435, 238.7

(56) References Cited

U.S. PATENT DOCUMENTS

| | | | |
|---|---|---|---|
| 3,834,451 A | | 9/1974 | Kozinski |
| 5,265,437 A | * | 11/1993 | Saperstein et al. ............ 62/243 |
| 5,289,698 A | | 3/1994 | Garimella |
| 5,291,960 A | * | 3/1994 | Brandenburg et al. ..... 180/65.2 |
| 5,934,097 A | * | 8/1999 | Karl ........................... 62/324.6 |
| 6,112,543 A | * | 9/2000 | Feuerecker et al. ........... 62/430 |
| 6,276,161 B1 | * | 8/2001 | Peiffer et al. ................. 62/406 |
| 6,491,090 B1 | | 12/2002 | Frugier et al. |

FOREIGN PATENT DOCUMENTS

| | | |
|---|---|---|
| DE | 3820811 A | 12/1989 |
| DE | 3834387 A | 4/1990 |
| DE | 19806654 A1 | 8/1999 |
| DE | 19818649 A1 | 10/1999 |
| EP | 0 999 078 A1 | 5/2000 |
| EP | 1 072 453 A2 | 1/2001 |
| EP | 1 249 358 A1 | 10/2002 |
| WO | WO 02/077426 A1 | 10/2002 |

OTHER PUBLICATIONS

English Abstract for European Publication EP 1 249 358 A1.
English Abstract for PCT Publication WO 02/077426 A1.
Derwent Abstract of German Application 3820811 A.
Derwent Abstract of German Application 3834387 A.
Derwent Abstract of German Application 19806654 A1.
Derwent Abstract of German Application19818649 A1.

* cited by examiner

*Primary Examiner*—William E. Tapolcai
(74) *Attorney, Agent, or Firm*—Brinks Hofer Gilson & Lione

(57) ABSTRACT

A heat exchanger module includes a glycol coolant circuit adapted to function as a heat pump for the heating of the interior passenger compartment of the motor vehicle with a glycol/water mixture as the heat carrier, a refrigerant circuit, and a glycol/refrigerant heat exchanger positioned between and interconnecting the cooling circuit and the refrigerant circuit, wherein the glycol/refrigerant heat exchanger has integrated connection lines for heat transfer from the coolant circuit to the refrigerant circuit.

5 Claims, 4 Drawing Sheets

COOLANT CIRCUIT OF A MOTOR VEHICLE HAVING A COOLANT/ REFRIGERANT HEAT EXCHANGER

BACKGROUND OF INVENTION

1. Technical Field of Invention

The present invention generally relates to a modified glycol coolant circuit within a motor vehicle having a coolant/refrigerant heat exchanger for thermal coupling of a cooling plant/heat pump with the coolant circuit, whereby the glycol circuit is adapted to the requirements of a heat pump for the heating of the interior passenger compartment of the motor vehicle with a glycol/water mixture as the heat carrier.

2. Description of the Prior Art

Cooling plants and heat pumps are utilized to cool or heat an interior space. The varying weather conditions caused by the sequence of seasons frequently require a heating system in winter and transitional periods and a cooling system in summer.

Prior art devices have been developed comprising the combination of a heat pump and a cooling plant to alternately provide heating or cooling to interior rooms of a building or to provide heating or cooling to the interior passenger compartment of an automotive vehicle.

Typically, in an automotive vehicle, heat from the engine is used to heat the interior of the vehicle. Modern combustion engines and electric motors tend to produce smaller and smaller amounts of waste heat. Therefore, future vehicle engines will yield sufficient amounts of heat to heat the passenger compartment, but not at the temperature level required. Particularly in winter, the cold-start phase is a problem. In some current diesel engine vehicles, supplementary heating systems with heater plugs, resistance heating systems, or fuel-fired burners have been provided, to supplement the heat provided by the engine.

Many automotive vehicles are equipped with a cooling plant to air condition the passenger compartment in hot weather situations. One alternative to using a supplementary heating system of improve the heating of the interior passenger compartment within the vehicle is to alternatively use the cooling plant as a heat pump in cold weather situations.

Prior art devices have combined cooling plants and heat pumps for use within automotive vehicles. The heat of the environment is used as a heat source, and alternatively, when needed, the temperature of the engine's waste heat is increased by the heat pump. For the use of a combined cooling plant/heat pump, where a glycol coolant circuit is the heat source of the heat pump, the cooling circuit must be adapted for this use.

Referring to FIG. 1, a prior art coolant circuit is divided into a first circuit 1 and a second circuit 2. A glycol/water mixture flows through the coolant circuit and is moved by a pump 7. The glycol/water mixture cools the engine 16, thereby assimilating heat and continuously flowing within the first circuit 1. A heat exchanger 3 of the heating system is positioned within the first circuit, whereby heat is absorbed from the glycol/water mixture and used to heat the passenger compartment of an automotive vehicle. A thermostat 4 is adapted to open when the temperature of the glycol/water mixture exceeds a pre-determined value. Once the thermostat 4 is opened, the glycol/water mixture is allowed to flow into the second circuit 2. A radiator is positioned within the second circuit 2 and is adapted to radiate heat from the glycol/water mixture to the environment, thereby removing waste heat of the engine to the environment.

In addition, the refrigerant circuit, which preferably uses carbon dioxide as refrigerant, is designed according to the state-of-the-art such that both the cooling plant operational mode and the heat pump operational mode are possible.

The refrigerant circuit and the coolant circuit each have a number of components. The components must be meticulously assembled, either manually or by automated methods, because leakage in the system will prevent the system from working properly. Space limitations add difficulties to the assembly of these components.

Therefore, it is the objective of this invention to provide a coolant circuit having features to transfer the heat to a refrigerant circuit wherein the coolant circuit optimizes size, maintenance, and assembly considerations, and the coolant circuit acts as the heat source for a heat pump to heat the passenger compartment of a motor vehicle.

SUMMARY OF THE INVENTION

The disadvantages of the prior art are overcome by providing a coolant circuit for a motor vehicle with a coolant/refrigerant heat exchanger for thermal coupling of a cooling plant/heat pump to the coolant circuit. The coolant circuit is preferably a glycol circuit, whereby the glycol circuit according to the invention is adapted to the requirements of a heat pump for the heating of the passenger compartment of the motor vehicle with a glycol/water mixture as heat carrier, wherein the glycol circuit is thermally coupled over the glycol/refrigerant heat exchanger to the refrigerant circuit of the cooling plant/heat pump such that the glycol/refrigerant heat exchanger together with the external heat exchanger, the radiator, the accumulator/ collector, and internal heat exchanger forms a space-saving, easy to assembly and low maintenance heat exchanger module with integrated connection lines for heat transfer from the glycol circuit to the refrigerant circuit.

In another aspect of the present invention, a high-pressure selector valve and a low-pressure selector valve of the refrigerant circuit are integrated into the heat exchanger module. The design of the coolant and refrigerant circuits according to the present invention allows the number of connection ports to be reduced, and the supplier can pre-assemble the heat exchanger module using dedicated assembly technology. These features result in cost savings and enhanced quality. Additionally, particularly in winter, the ride comfort improves due to the coupling according to the present invention of the coolant and refrigerant circuits and use of the heat pump, as the desired temperature in the interior of the passenger compartment can be achieved more rapidly.

Further details, features and advantages of the invention ensue from the following description of examples of embodiments with reference to the drawings.

DETAILED DESCRIPTION OF THE INVENTION

The following description of the preferred embodiment of the invention is not intended to limit the scope of the invention to this preferred embodiment, but rather to enable any person skilled in the art to make and use the invention.

Figure 1:
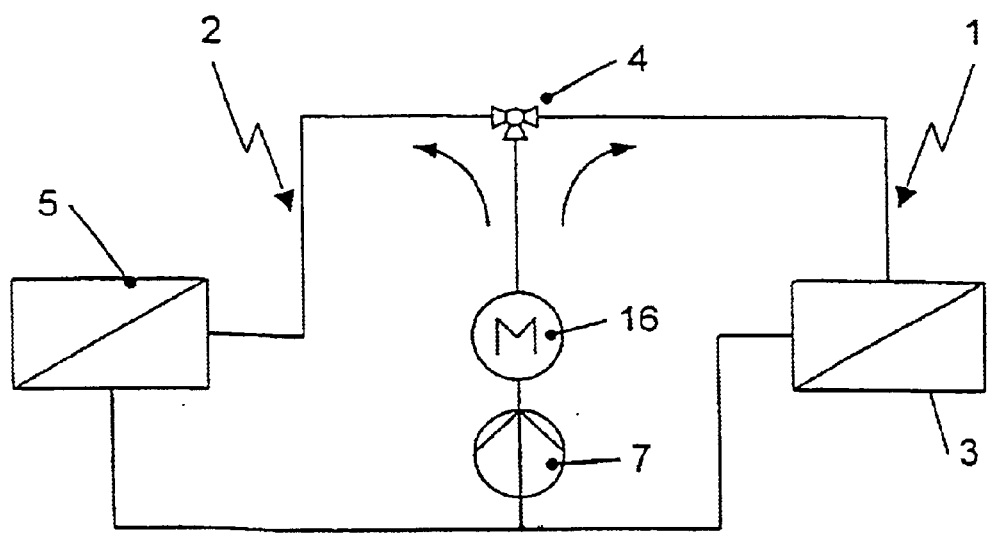
FIG. 1 is a schematic view of a prior art coolant circuit.
Figure 2:
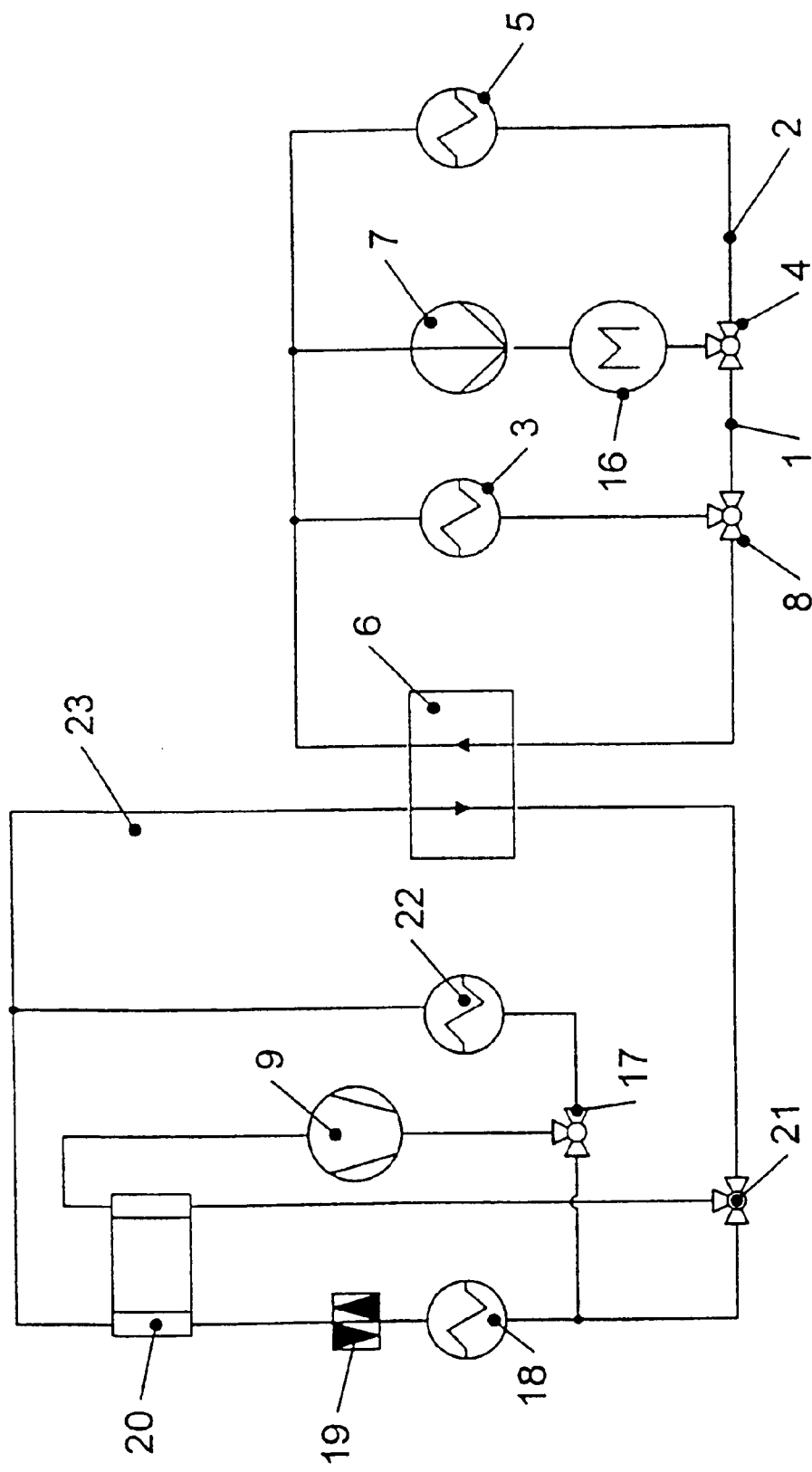
FIG. 2 is a schematic view of a refrigerant circuit and a coolant circuit for a heat pump.

Referring to FIG. 2, a first preferred embodiment of the cooling circuit according to the present invention is shown. A glycol circuit 1, 2 is thermally coupled over a glycol/refrigerant heat exchanger 6 to a refrigerant circuit 23. The refrigerant circuit 23 is adapted to function as either a cooling plant, for cooling and air conditioning of the passenger compartment or as a heat pump, for the heating of the passenger compartment of the vehicle.

When the cooling circuit is operating as a cooling plant, the refrigerant is compressed in the compressor 9. Preferably, the refrigerant is carbon dioxide (R744), tetrafluorethane (R134a), or propane (R290), however it is to be understood, that other refrigerants could be used within the scope of the present invention.

The compressed refrigerant passes through a high-pressure selector valve 17 and into an external heat exchanger 22, where the refrigerant dissipates heat energy to the environment. The cooled, and at least partially condensed, refrigerant then passes through an internal heat exchanger 20, which also functions as an accumulator/collector, and on to a flash element 19, where the refrigerant expands to the evaporation pressure level. When the cooling circuit is functioning as a cooling plant, an internal heat exchanger 18 functions as an evaporator, wherein the refrigerant evaporates, thereby taking heat from the passenger compartment. The vaporized refrigerant then passes through a low-pressure selector valve 21 and a low-pressure side of the internal heat exchanger 20 to the compressor 9, where the circuit for operation as a cooling plant closes.

When the circuit is operating as a heat pump, the refrigerant is first compressed in the compressor 9, then flows through the high-pressure selector valve 17 to the internal heat exchanger 18. The internal heat exchanger 18 works as a condenser when the circuit is operating as a heat pump, and dissipates the condensation heat to the passenger compartment for heating. The refrigerant then flows in a direction opposite to the direction of flow in coolant plant mode, through the expansion element 19 and the internal heat exchanger 20 and finally reaches the glycol/refrigerant heat exchanger 6, which thermally couples the refrigerant circuit to the coolant circuit. Within the glycol/refrigerant heat exchanger 6, the liquid refrigerant takes heat from the coolant circuit while evaporating, and the refrigerant vapor then passes through the low-pressure selector valve 21 and the low-pressure side of the internal heat exchanger 20 to the compressor 9.

When functioning as a cooling plant, the external heat exchanger 22 is bypassed, and when functioning as a heat pump, the glycol/refrigerant heat exchanger 6 is bypassed. All other components of the circuit are required for both operation as a cooling plant and as a heat pump.

When using the engine's waste heat as a heat source as shown in FIG. 2, the engine heat is fed to the heat pump through the coolant circuit. To achieve this, the glycol/refrigerant heat exchanger 6 is channelled into the small circuit 1 of the glycol circuit parallel to the heating heat exchanger 3.

In the coolant circuit the glycol/water mixture is moved by a pump 7. The glycol/water mixture passes through the cooling system of the engine 16 and absorbs waste heat of the engine. Within a thermostat valve 4 the coolant is passed into the small circuit 1 and/or the big circuit 2. In the small circuit 1 the coolant flows to a multi-way directional valve 8, where the coolant flow is divided, flowing in parallel through the glycol/refrigerant heat exchanger 6 and the heating heat exchanger 3. In this way, the multi-way directional valve is adapted to enable both the parallel passage of the heating heat exchanger 3 and the glycol/refrigerant heat exchanger 6, and the alternate single passage of the heat exchangers 3, 6.

The refrigerant is then again moved by the pump 7 through the engine 16 to absorb waste heat from the engine, thus closing the circuit. When the heating demand of the passenger compartment decreases, the thermostat valve 4 provides the big circuit 2 with coolant in that measure as less heat is needed and the engine's waste heat is dissipated through the radiator 5 to the environment.

Dependent on the operational cycle different switching versions must be made possible by the coolant and refrigerant circuits 2, 23. These operation versions include operation as an air conditioner; operating to reheat or heat; warm-up operation, wherein the circuit operates as a heat pump with glycol as the heat source; stationary operation or operating to heat the heat exchanger, wherein after the glycol reaches the necessary temperature the heat pump is switched off; and safety function. If the refrigerant is unintendedly stored in the refrigerant/glycol heat exchanger and does not actively take part in the circuit operation as a cooling plant, the heat exchanger is passed by "warm" glycol and the refrigerant "expelled".

To achieve these variations, a multi-way directional valve 8 is provided within the coolant circuit. The multi-way directional valve is adapted to function either as a thermostat or as an electronic valve. Further, the multi-way directional valve 8 is adapted to function as an electrical controlling unit so that it can also be used for flow control, and hence temperature control, of the heat exchanger 3 of the heating system. This also allows the system to be smaller by eliminating components normally required for the air conditioning unit.

Figure 3:
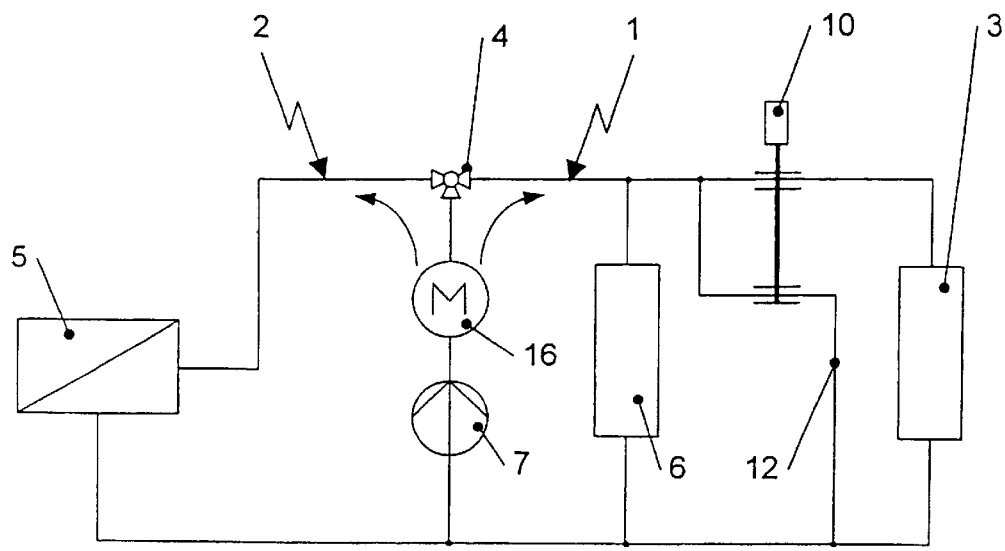
FIG. 3 is a schematic view of a glycol circuit with a bypass for the glycol/refrigerant heat exchanger and controlled heating heat exchanger.

Referring to FIG. 3, in a second preferred embodiment, an electrical controlling unit is adapted such that the flow through the heating heat exchanger is controlled with a multiway water valve 10, whereby a bypass flow is passed over the glycol/refrigerant heat exchanger 6.

Figure 4:
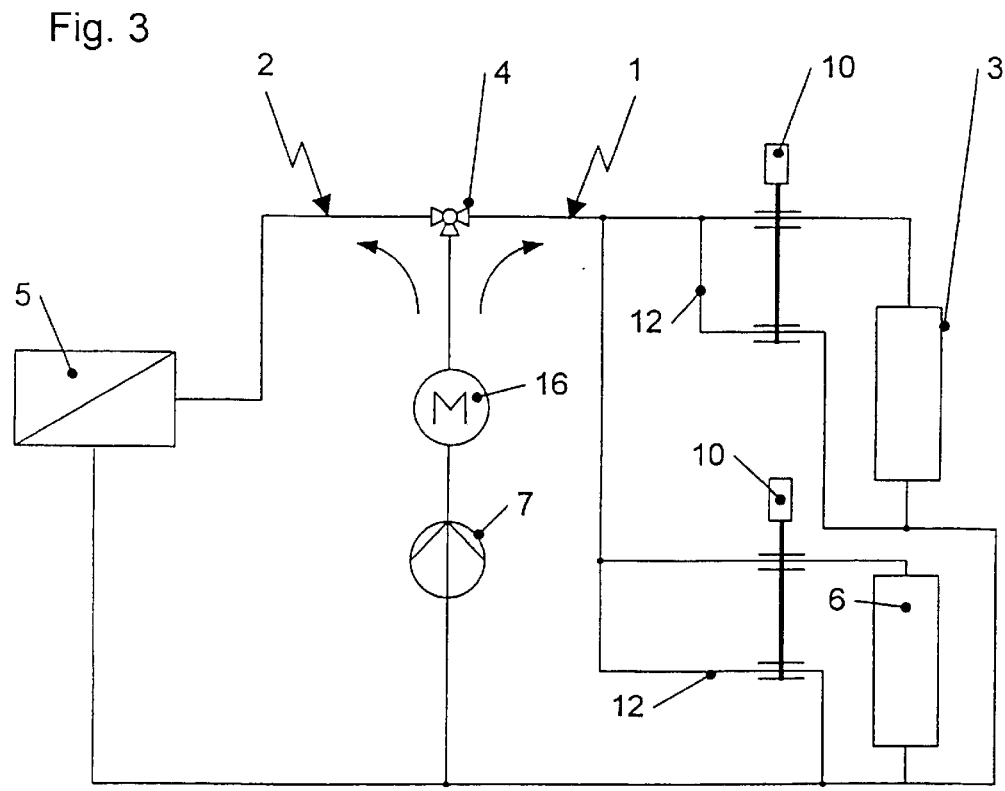
FIG. 4 is a schematic view of a Glycol circuit with a controlled glycol/refrigerant heat exchanger and a controlled heating heat exchanger.

Referring to FIG. 4, by using two-way water valves 10, the coolant flow can be controlled over both heat exchangers 3, 6, or over several heating heat exchangers 3 or heat exchanger zones that are given different temperatures. Multiway valves could also be used in place of the two-way water valves 10.

Figure 5:
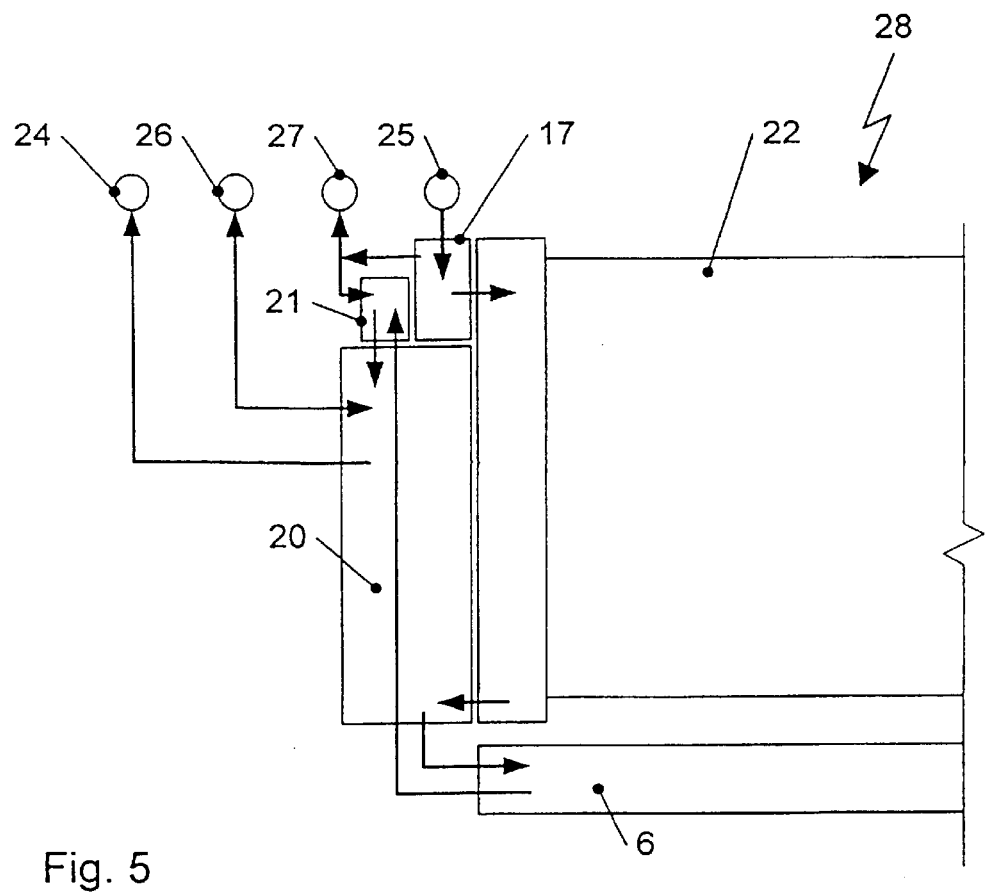
FIG. 5 is a schematic front view of a heat exchanger module of the present invention.
Figure 6:
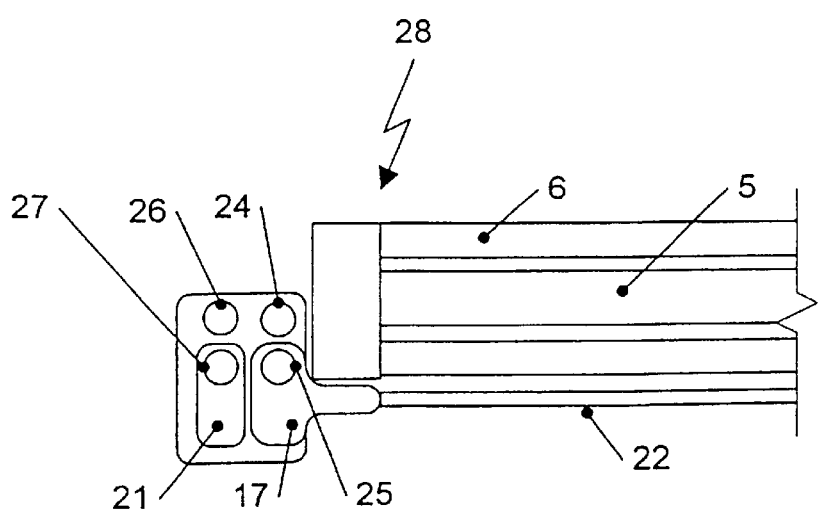
FIG. 6 is a schematic top view of the heat exchanger module shown in FIG. 5.

By use of the heat pump according to the present invention the space requirements of the heating heat exchangers can be reduced by up to 30%. Referring to FIGS. 5 and 6, The space-saving design and arrangement of heat exchangers and valves according to the present invention is illustrated.

According to the present invention, the glycol/refrigerant heat exchanger 6 for thermal coupling of the cooling plant/heat pump to the glycol circuit is combined with the external heat exchanger 22, radiator 5, and accumulator/collector and internal heat exchanger 20 to form a space-saving, easy to assembly, and maintenance-friendly heat exchanger module 28, which contains connection lines between the components of the module 28.

The structural integration of the glycol/refrigerant heat exchanger 6, external heat exchanger 22, and radiator 5 reduces the number of connections and enables a compact design with reduced leakage flow.

It is particularly advantageous to integrate the high-pressure selector valve 17 and the low-pressure selector valve 21 of the refrigerant circuit 23 into the heat exchanger module 28. This allows that the heat exchanger module 28 to be equipped with only four refrigerant outer ports. One port for the connection of the heat exchanger module 28 to the suction side of the compressor 24, one port for the connection to the pressure side of the compressor 25, one port for the connection to the flash element 26, and one port for the connection to the internal heat exchanger 27. Additionally, the heat exchanger module 28 includes four coolant ports, which are not shown, for the connection to the radiator 5 and glycol/refrigerant heat exchanger 6.

Preferably, a connection line from the glycol/refrigerant heat exchanger 6 and the low-pressure selector valve 21 is installed within the accumulator/collector and internal heat exchanger 20, such that the connection of the line to the glycol/refrigerant heat exchanger 6 and the low-pressure selector valve 21 is performed during the pre-assembly process, thereby eliminating another connection point.

The glycol/refrigerant heat exchanger 6 is dimensioned according to the invention such that during the start phase of the engine 16 in winter operation only a portion of the waste heat is taken from the glycol circuit. This is necessary because at very deep temperatures the engine works with a very low efficiency and produces harmful noxious emissions. Therefore, only heat that originates from the operation of the compressor 9 can be used. This portion should be in the range of approximately 50%, depending upon the dimensioning of the engine. At higher temperatures of the glycol in warmed-up conditions of the engine 16 this limit no longer applies.

The foregoing discussion discloses and describes the preferred embodiments of the invention. One skilled in the art will readily recognize from such discussion, and from the accompanying drawings and claims, that changes and modifications can be made to the invention without departing from the scope of the invention as defined in the following claims. The invention has been described in an illustrative manner, and it is to be understood that the terminology which has been used is intended to be in the nature of words of description rather than of limitation.

What is claimed is:

1. A heat exchanger module comprising:
   a glycol coolant circuit adapted to function as a heat pump and to provide heated air to an interior passenger compartment of a motor vehicle with a glycol/water mixture as a heat carrier;
   a refrigerant circuit adapted to provide cooled air to the interior passenger compartment of the motor vehicle, said refrigerant circuit having a high-pressure selector valve and a low-pressure selector valve integrated therein;
   a glycol/refrigerant heat exchanger positioned between and interconnecting said coolant circuit and said refrigerant circuit, said glycol/refrigerant heat exchanger having integrated connection lines for heat transfer from said coolant circuit to said refrigerant circuit; and
   a connection line from said glycol/refrigerant heat exchanger and said low-pressure selector valve, said connection line being installed within an accumulator/collector and internal heat exchanger.

2. The heat exchanger module of claim 1 further including a plurality of refrigerant ports adapted to connect to a suction side of a compressor, to a pressure side of the compressor, to a flash element, and to an internal heat exchanger.

3. The heat exchanger module of claim 1 further including a plurality of coolant ports for connecting to a radiator and to said glycol/refrigerant heat exchanger.

4. The heat exchanger module of claim 1 wherein said glycol circuit and said glycol/refrigerant heat exchanger are switched parallel to a heating heat exchanger, said heat exchanger module further including a multi-way directional valve adapted to control the proportions of the flow of coolant through said glycol/refrigerant heat exchanger and said heating heat exchanger based upon the heat demand within the passenger compartment and the temperature of the coolant.

5. The heat exchanger module of claim 1 further including at least one two-way water valve positioned within said glycol circuit and adapted to allow the coolant flow to bypass said glycol/refrigerant heat exchanger and said heating heat exchanger.

* * * * *